(12) United States Patent
Kanda

(10) Patent No.: US 8,468,257 B2
(45) Date of Patent: Jun. 18, 2013

(54) COMMUNICATION SYSTEM, COMMUNICATION APPARATUS, AND CONTROL METHOD THEREOF

(75) Inventor: Tetsuo Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 12/127,537

(22) Filed: May 27, 2008

(65) Prior Publication Data

US 2008/0313304 A1    Dec. 18, 2008

(30) Foreign Application Priority Data

Jun. 14, 2007    (JP) ................................ 2007-157745

(51) Int. Cl.
*G06F 15/16* (2006.01)
(52) U.S. Cl.
USPC .............................. 709/228; 709/227; 710/62
(58) Field of Classification Search
USPC ......................................................... 709/228
See application file for complete search history.

(56) References Cited

U.S. PATENT DOCUMENTS

| | | | |
|---|---|---|---|
| 6,625,152 B1 * | 9/2003 | Monsen et al. | 370/392 |
| 7,616,593 B2 * | 11/2009 | Jung et al. | 370/310 |
| 8,046,517 B2 * | 10/2011 | Morozumi | 710/313 |
| 2002/0105678 A1 * | 8/2002 | Shiraiwa | 358/1.15 |
| 2004/0009769 A1 | 1/2004 | Yokoyama | |
| 2004/0122649 A1 | 6/2004 | Bartek et al. | |
| 2004/0189808 A1 * | 9/2004 | Tanaka | 348/207.1 |
| 2004/0205280 A1 * | 10/2004 | Jeansonne et al. | 710/306 |
| 2005/0052689 A1 * | 3/2005 | Itsukaichi | 358/1.15 |
| 2005/0185205 A1 * | 8/2005 | Eckhaus et al. | 358/1.13 |
| 2006/0007478 A1 * | 1/2006 | Ryu et al. | 358/1.15 |
| 2006/0200563 A1 * | 9/2006 | Hirose | 709/227 |
| 2006/0212610 A1 * | 9/2006 | Nago et al. | 710/16 |
| 2006/0242304 A1 * | 10/2006 | Hirose et al. | 709/227 |
| 2007/0035754 A1 * | 2/2007 | Hori et al. | 358/1.9 |
| 2007/0223046 A1 * | 9/2007 | Shiraiwa | 358/296 |
| 2008/0005395 A1 * | 1/2008 | Ong et al. | 710/36 |

(Continued)

FOREIGN PATENT DOCUMENTS

| | | |
|---|---|---|
| CN | 1532683 A | 9/2004 |
| EP | 1696655 A | 8/2006 |

(Continued)

OTHER PUBLICATIONS

The above references were cited in a Jul. 30, 2010 Chinese Office Action, that issued in Chinese Patent Application No. 200810111088.9.

(Continued)

*Primary Examiner* — Firmin Backer
*Assistant Examiner* — Hamza Algibhah
(74) *Attorney, Agent, or Firm* — Cowan, Liebowitz & Latman, P.C.

(57) ABSTRACT

A multiple control station transits a first broadcast frame including a first identifier for identifying a first host and a second broadcast frame including a second identifier for identifying a second host to a terminal station over a wireless channel using time division. The multiple control station then receives a connection request frame that requests connection with the first host or the second host from the terminal station. Arbitration is then performed so that the terminal station is connected to the first host or the second host in accordance with the first identifier or the second identifier included in the received connection request frame.

8 Claims, 7 Drawing Sheets

U.S. PATENT DOCUMENTS

| | | | |
|---|---|---|---|
| 2008/0142060 A1* | 6/2008 | Orth et al. .................... | 135/91 |
| 2008/0162481 A1* | 7/2008 | Sadjadi ........................... | 707/8 |
| 2008/0195865 A1* | 8/2008 | Nikander ...................... | 713/170 |
| 2008/0263140 A1* | 10/2008 | Yoshikawa et al. ........... | 709/203 |
| 2008/0313382 A1* | 12/2008 | Nurmi et al. ................... | 710/314 |
| 2010/0235427 A1* | 9/2010 | Sotomaru et al. .............. | 709/203 |

FOREIGN PATENT DOCUMENTS

| | | |
|---|---|---|
| JP | 2000-232681 | 8/2000 |
| JP | 2003-008684 | 1/2003 |
| JP | 2004-078359 | 3/2004 |
| JP | 2006-343852 A | 12/2006 |
| WO | 2004/095777 A | 11/2004 |

OTHER PUBLICATIONS

The above references were cited in a Jun. 10, 2011 European Search Report of the counterpart European Patent Application No. 08158252.0.

* cited by examiner

F I G. 2
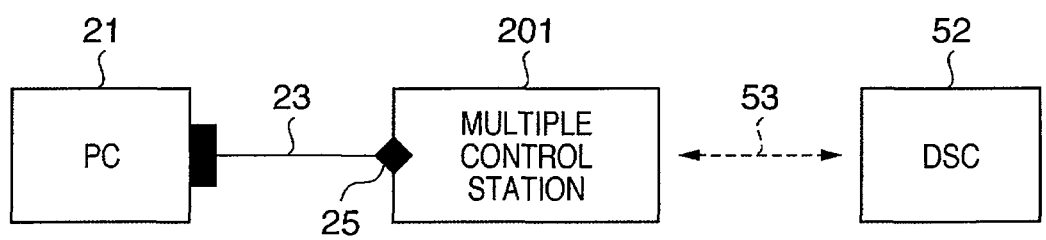

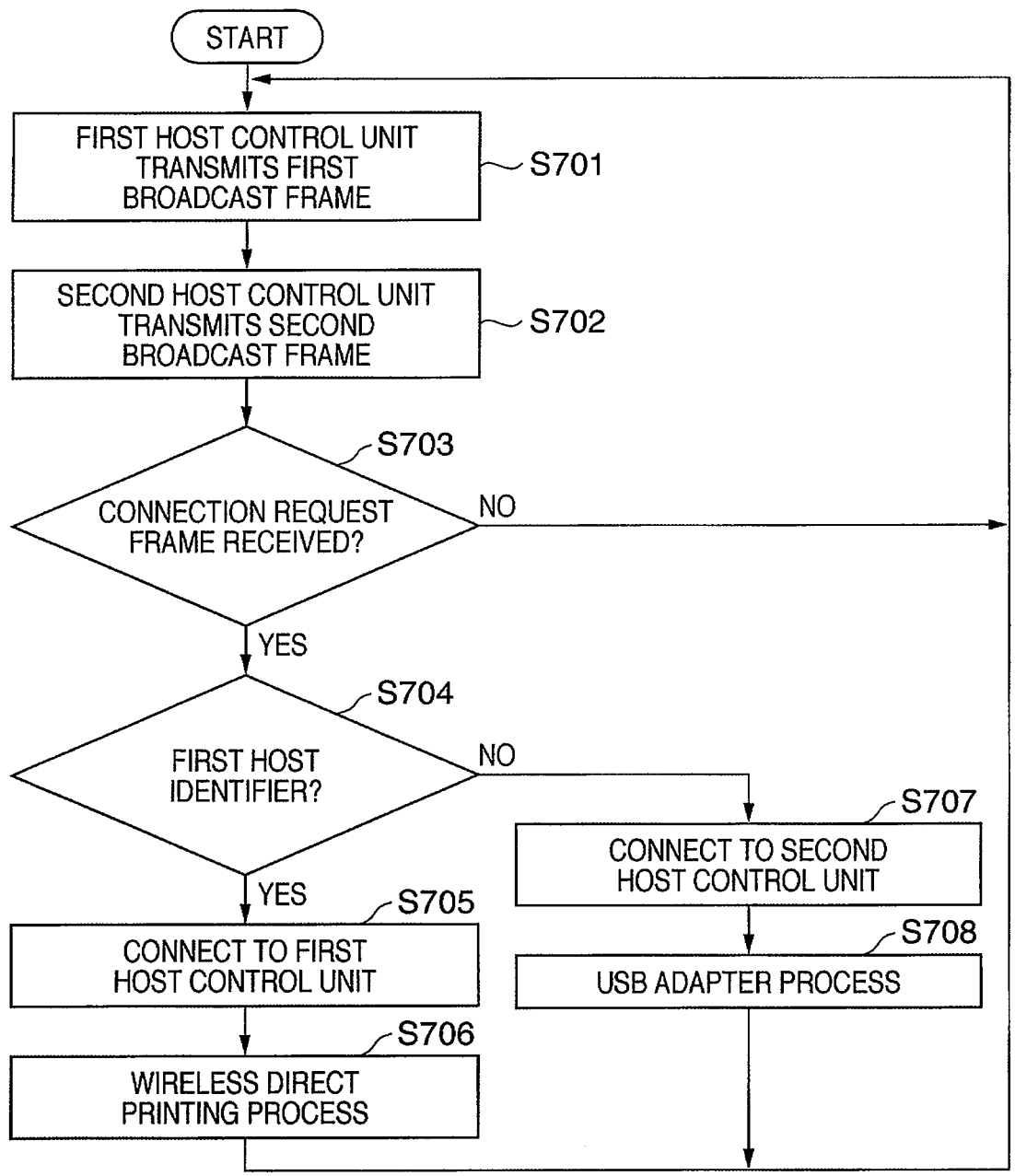

COMMUNICATION SYSTEM, COMMUNICATION APPARATUS, AND CONTROL METHOD THEREOF

BACKGROUND OF THE INVENTION

1. Field of the Invention

The present invention relates to a communication system, a communication apparatus, and a control method thereof.

2. Description of the Related Art

USB (Universal Serial Bus) is a conventional technology developed as a means to connect peripheral devices to a personal computer. The personal computer generally acts as the host, whereas the peripheral device, exemplified by a printer, image scanner, or the like, acts as the device.

However, in recent years, the USB standard is also being used for connecting other consumer devices to one another, and thus devices aside from personal computers are beginning to function as USB hosts as well. An example of this is a direct printing scheme, whereby a digital still camera (DSC) and a printer are connected 1-to-1 via USB, and photographic images stored in the digital still camera are printed out via the printer. In such a case, the printer functions as the host, and the digital still camera functions as the device.

Generally speaking, printers including such direct printing functionality have both a USB device port, used when functioning as a device and connecting to a personal computer, and a USB host port, used when functioning as a host and connecting to a digital still camera.

Furthermore, in recent years, the wireless USB (WUSB) protocol, which makes wireless USB communication possible, has been standardized, and thus communication that once was implemented through wired USB can now be implemented wirelessly.

Using the WUSB system makes it possible to realize wireless direct printing.

WUSB functionality can be integrated directly into the host or the device, and can also be implemented by connecting a WUSB adapter to a device already equipped with a standard USB interface.

Furthermore, printers can be provided with wireless-direct-printing functionality and WUSB adapter functionality as well.

In the following descriptions, a printer provided with both WUSB adapter functionality and wireless-direct-printing functionality should be called a "multiple control station".

As an example of related art, a technique for connecting a plurality of wireless terminals to a single USB device has been disclosed (Patent Document 1: Japanese Patent Laid-Open No. 2004-78359).

As another example of related art, there is a wireless modem provided with both a wired external interface and a wireless external interface (Patent Document 2: Japanese Patent Laid-Open No. 2003-8684).

Furthermore, as yet another example of related art, there is a facsimile device provided with functionality for printing data from a wireless terminal (Patent Document 3: Japanese Patent Laid-Open No. 2000-232681).

However, the following problems can be considered with regards to multiple control stations.

First, it is necessary for a user to perform a switching operation or the like on the multiple control station when switching between WUSB adapter operations and wireless-direct-printing operations. When performing direct prints using a wired USB system, the user does not need to perform any particular operations with regard to the printer. Particularly, when compared to the wired USB, where the printer switches into an operational mode simply by connecting the digital still camera via a cable. On the other hand, since the multiple control station using the wireless USB needs to expressly switch an operation by the switching operation or the like, the above system lacks convenience.

Second, a situation where the adapter functionality is stopped while wireless direct printing is being executed can also be considered. Such a case presents a problem in that other WUSB devices cannot connect to the personal computer during the period in which the adapter functionality is stopped.

With regards to the related art, the technique disclosed in Patent Document 1 selects a plurality of wireless devices and connects those devices to a single USB host, and thus cannot be applied to a multiple control station that has a plurality of USB hosts.

Meanwhile, Patent Document 2 discloses a configuration in which the operational mode of a wireless modem is switched depending on the state of connections with a wired interface. For this reason, it is necessary for a user to perform operations for connecting/disconnecting devices to/from the wired interface in order to switch the operational mode, resulting in a system that lacks convenience.

Finally, according to the technique disclosed in Patent Document 3, printing and external connections are limited to a single wireless terminal only, and thus it is impossible to simultaneously provide a plurality of functions with a plurality of wireless terminals present.

SUMMARY OF THE INVENTION

It is an object of the present invention to enable the efficient use of a plurality of host functions through an operation performed on a terminal station.

It is a further object of the present invention to enable a plurality of terminal stations to connect to a device that has a plurality of host functions.

According to one aspect of the present invention, there is provided a communication system comprises a control station and a terminal station, wherein the control station comprises: a communication unit to transmit a first broadcast frame including a first identifier for identifying a first host and a second broadcast frame including a second identifier for identifying a second host over a wireless channel, and to receive a connection request frame that requests connection with the first host or the second host from the terminal station; and a host selection unit to select whether to connect the terminal station to the first host or the second host in accordance with the first identifier or the second identifier included in the connection request frame received by the communication unit.

According to another aspect of the present invention, there is provided a communication apparatus comprises: a communication unit to transmit a first broadcast frame including a first identifier for identifying a first host and a second broadcast frame including a second identifier for identifying a second host over a wireless channel, and to receive a connection request frame that requests connection with the first host or the second host from a terminal station; and a selection unit to select whether to connect the terminal station to the first host or the second host in accordance with the first identifier or the second identifier included in the connection request frame received by the communication unit.

According to still another aspect of the present invention, there is provided a control method for a communication apparatus, the method comprises: transmitting a first broadcast frame including a first identifier for identifying a first host and a second broadcast frame including a second identifier for identifying a second host over a wireless channel; receiving a connection request frame that requests connection with the first host or the second host from a terminal station; and selecting to connect the terminal station to the first host or the second host in accordance with the first identifier or the second identifier included in the connection request frame received.

Further features of the present invention will become apparent from the following description of exemplary embodiments (with reference to the attached drawings).

BRIEF DESCRIPTION OF THE DRAWINGS

FIG. 2 is a diagram illustrating an example of the configuration of a wireless-communication system according to the first embodiment of the present invention.

FIG. 7 is a flowchart illustrating a control procedure of a multiple control station 201 according to the first embodiment of the present invention.

DESCRIPTION OF THE EMBODIMENTS

Preferred embodiments for carrying out the present invention shall be described in detail hereinafter with reference to the drawings.

First Embodiment

Figure 1:
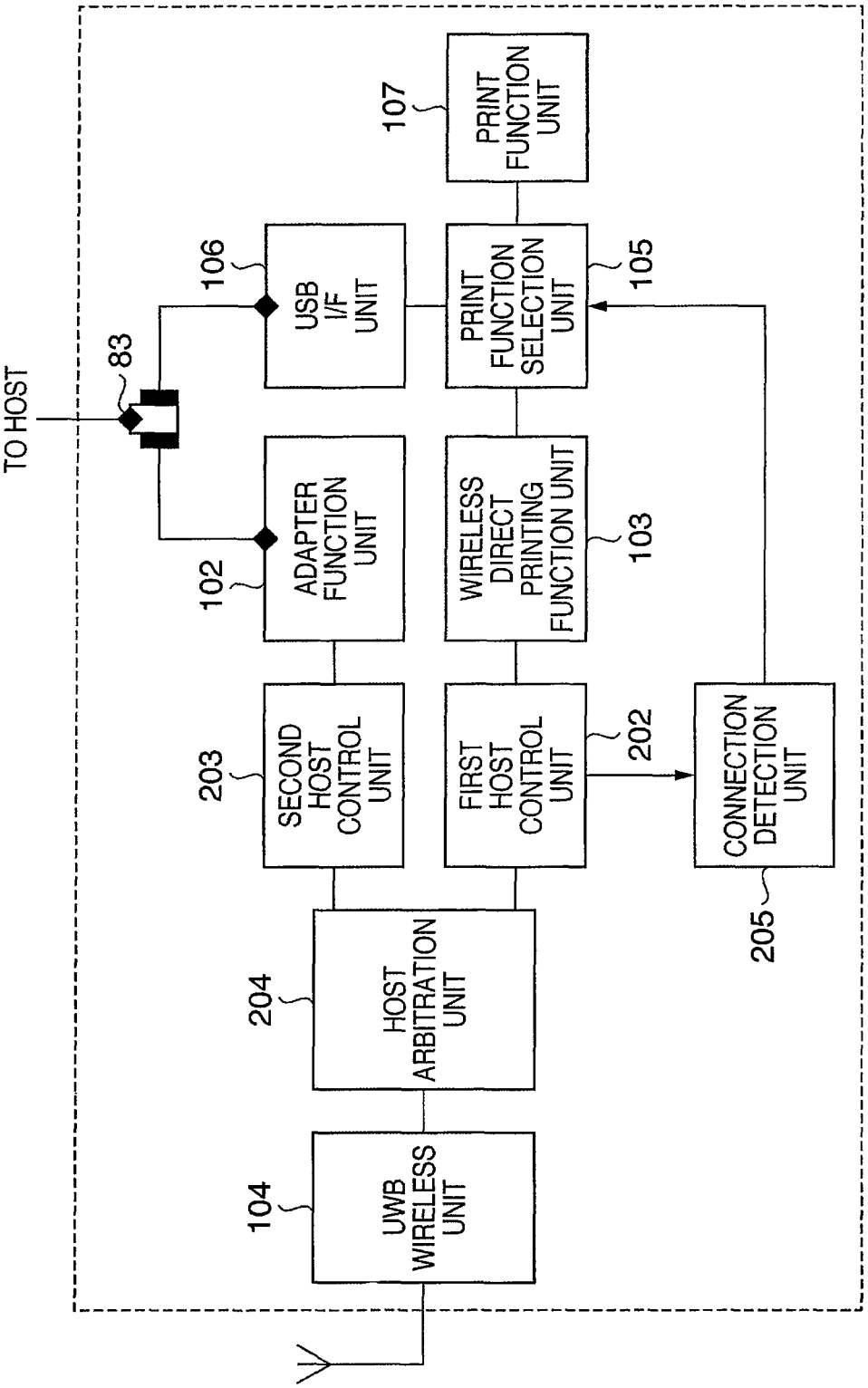
FIG. 1 is a diagram illustrating an example of the internal configuration of a multiple control station according to a first embodiment of the present invention.

FIG. 1 is a diagram illustrating an example of the internal configuration of a multiple control station according to the first embodiment of the present invention. Meanwhile, FIG. 2 is a diagram illustrating an example of the configuration of a wireless-communication system according to the first embodiment of the present invention.

In FIG. 2, a multiple control station 201, which has a print function, is connected to a personal computer 21 via a USB cable 23, and operates as a wireless USB (WUSB) adapter. At the same time, the multiple control station (printer) 201 can also print photographs from a terminal station (digital still camera) 52 using wireless direct printing 53.

An internal hub 83 functions as a wired USB hub. A USB interface unit (I/F) 106 is connected to the internal hub 83 and functions as a wired USB interface. A print-function selection unit 105 selects one of the USB interface unit 106 and a wireless-direct-printing function unit 103 and connects the selected unit to a print function unit 107. An adapter function unit 102 functions as a WUSB adapter to which devices that have a wired USB interface connect. A UWB (Ultra Wide Band) wireless unit 104 sends and receives UWB wireless signals via an antenna. WUSB communication uses wireless UWB as its communication scheme, whereby USB communication is carried out wirelessly.

The wireless-direct-printing function unit 103 is a functional unit for carrying out direct printing via a WUSB wireless link. The wireless-direct-printing function unit 103 also holds an identifier used so that the multiple control station 201 can operate as a wireless-direct-printing host. This identifier shall be called a "first host identifier" hereinafter. A first host control unit 202 uses this first host identifier to execute wireless protocol processing in accordance with the WUSB host function.

Meanwhile, the adapter function unit 102 connects to the personal computer 21 via the internal hub 83, and acquires a host identifier held by the personal computer 21 from the personal computer 21. This host identifier has a value different from the first host identifier, and shall be called a "second host identifier" hereinafter. A second host control unit 203 uses this second host identifier to execute wireless protocol processing in accordance with the WUSB host function.

A host arbitration unit 204 arbitrates control performed by the first host control unit 202 and the second host control unit 203 with respect to the UWB wireless unit 104. For example, if the first host control unit 202 or the second host control unit 203 requests the wireless transmission of a transmission frame, the host arbitration unit 204 receives the transmission frame and then passes it to the UWB wireless unit 104. The UWB wireless unit 104 then transmits the transmission frame from the antenna as a UWB wireless signal.

Conversely, if the UWB wireless unit 104 has received a wireless frame, the host arbitration unit 204 receives the frame from the UWB wireless unit 104. The host arbitration unit 204 then analyzes the details of the frame, and passes the frame to the first host control unit 202 if it is a frame related to wireless direct printing, or to the second host control unit 203 if it is a frame related to the personal computer 21.

In this manner, the first host control unit 202 and the second host control unit 203 can control the UWB wireless unit 104, which communicates over wireless channels using a time-division scheme, through the host arbitration unit 204. The two host control units 202 and 203 can be thought of as two hosts that operate independently while sharing the UWB wireless unit 104.

Note that when constructing the wireless-communication system illustrated in FIG. 2, the user executes a pairing process between the multiple control station 201 and the personal computer 21, and configures the second host identifier. Similarly, the user also executes a pairing process between the multiple control station 201 and the terminal station 52, configuring the digital still camera 52 so that the first host identifier is the identifier corresponding to the direct printing host and the second host identifier is the identifier corresponding to the wireless USB adapter host.

Next, the process by which the multiple control station 201 switches to either the wireless-direct-printing function or the personal computer 21 adapter function in response to a request from the digital still camera 52 shall be described with reference to FIGS. 3 and 4.

Figure 3:
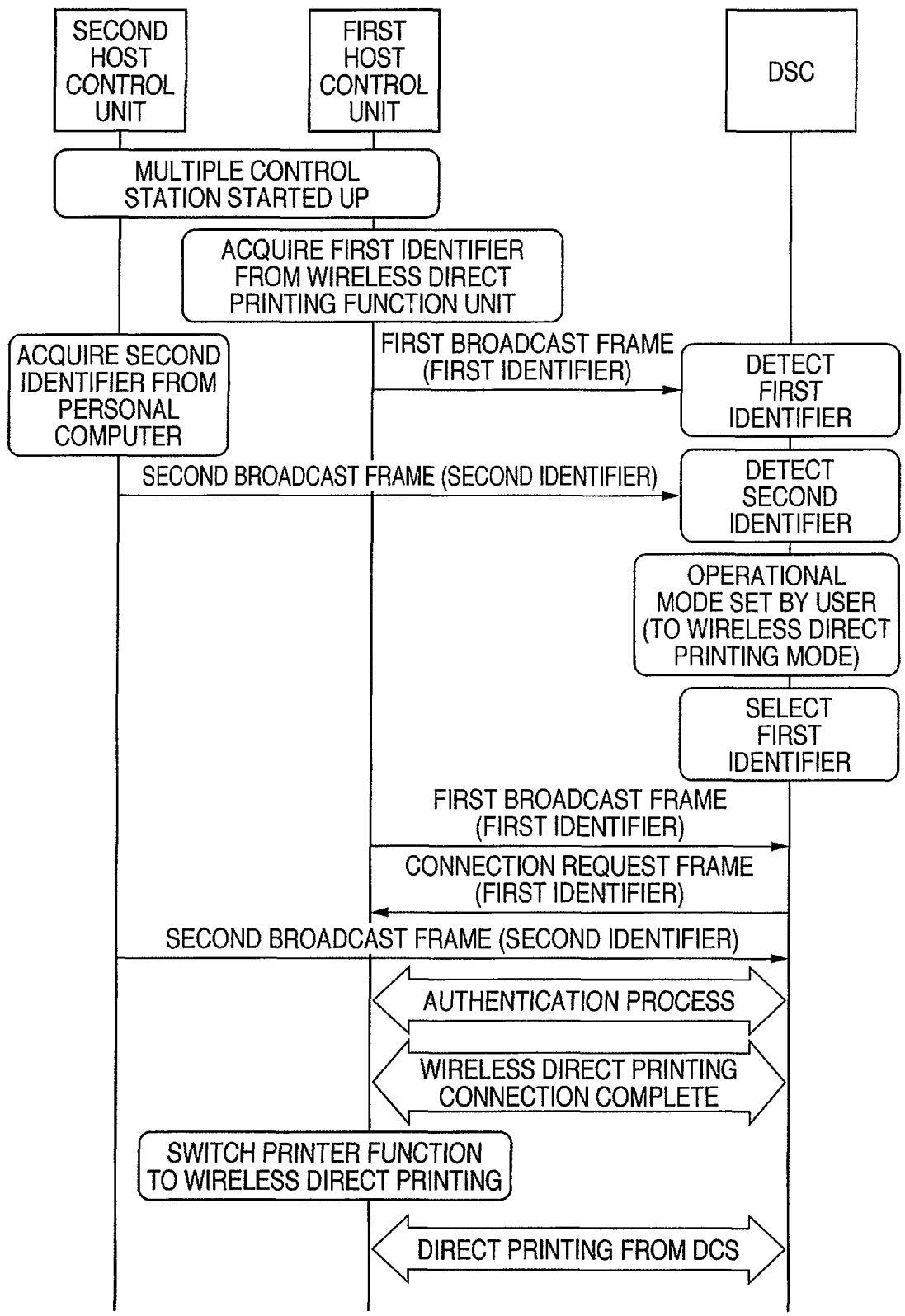
FIG. 3 is a diagram illustrating an operational sequence carried out when a multiple control station 201 has received a wireless-direct-printing request from a digital still camera 52.

FIG. 3 is a diagram illustrating an operational sequence carried out when the multiple control station 201 has received a wireless-direct-printing request from the digital still camera 52. Physically speaking, the first host control unit 202 and the second host control unit 203 provided in the multiple control station 201 communicate with the digital still camera 52 via the host arbitration unit 204 and the UWB wireless unit 104. However, for the sake of simplicity, only the logical exchange of frames between the first host control unit 202/the second host control unit 203 and the digital still camera 52 is illustrated in FIG. 3.

First, when the multiple control station 201 is started up, the first host control unit 202 receives the first host identifier from the wireless-direct-printing function unit 103, and repeatedly transmits a first broadcast frame, which includes the first host identifier, in a cyclical manner. Furthermore, the second host control unit 203 repeatedly transmits a second broadcast frame, which includes the second host identifier configured through the abovementioned pairing process, in a cyclical manner. Note that at this point in time, the print-function selection unit 105 selects the USB interface unit 106 and logically connects it to the print function unit 107. In other words, the multiple control station 201 can function as a peripheral device connected to the personal computer 21 via the USB cable 23 and execute printing operations.

Meanwhile, the digital still camera 52 alternately receives the first broadcast frame and the second broadcast frame, and detects the first and second host identifiers included in the respective broadcast frames. Here, if the user wishes to execute wireless direct printing, s/he specifies a wireless-direct-printing mode by performing button operations or the like on the digital still camera 52.

Through this, the digital still camera 52 selects the first host identifier, which specifies wireless direct printing as the host based on the configuration made through the above-mentioned pairing process. A connection request frame that includes the first host identifier is then transmitted as a response to the first broadcast frame.

Meanwhile, when the multiple control station 201 receives the connection request frame that includes the first host identifier, the host arbitration unit 204 within the multiple control station 201 takes that connection request frame from the UWB wireless unit 104. The host arbitration unit 204 then analyzes the details of this frame, and passes the connection request frame to the first host control unit 202 if the results of the analysis indicate that the first host identifier is present therein.

Thereafter, the first host control unit 202 performs an authentication process with the digital still camera 52 based on the WUSB host protocol, and ultimately, the connection between the digital still camera 52 and the multiple control station 201 is completed. The digital still camera 52 is then able to execute wireless direct printing.

Next, the first host control unit 202 notifies a connection detection unit 205 that the digital still camera 52 has been connected for wireless-direct-printing operations. The connection detection unit 205 then instructs the print-function selection unit 105 to disconnect the USB interface unit 106, which has thus far been logically connected to the print function unit 107. The connection detection unit 205 further instructs the print-function selection unit 105 to connect the wireless-direct-printing function unit 103 to the print function unit 107. Through this, the print function unit 107 is connected to the digital still camera 52 based on the control of the wireless-direct-printing function unit 103, enabling photographs to be printed from the digital still camera 52.

Next, operations for connecting the digital still camera 52, serving as a WUSB device, to the personal computer 21 using the adapter function of the multiple control station 201, shall be described.

Figure 4:
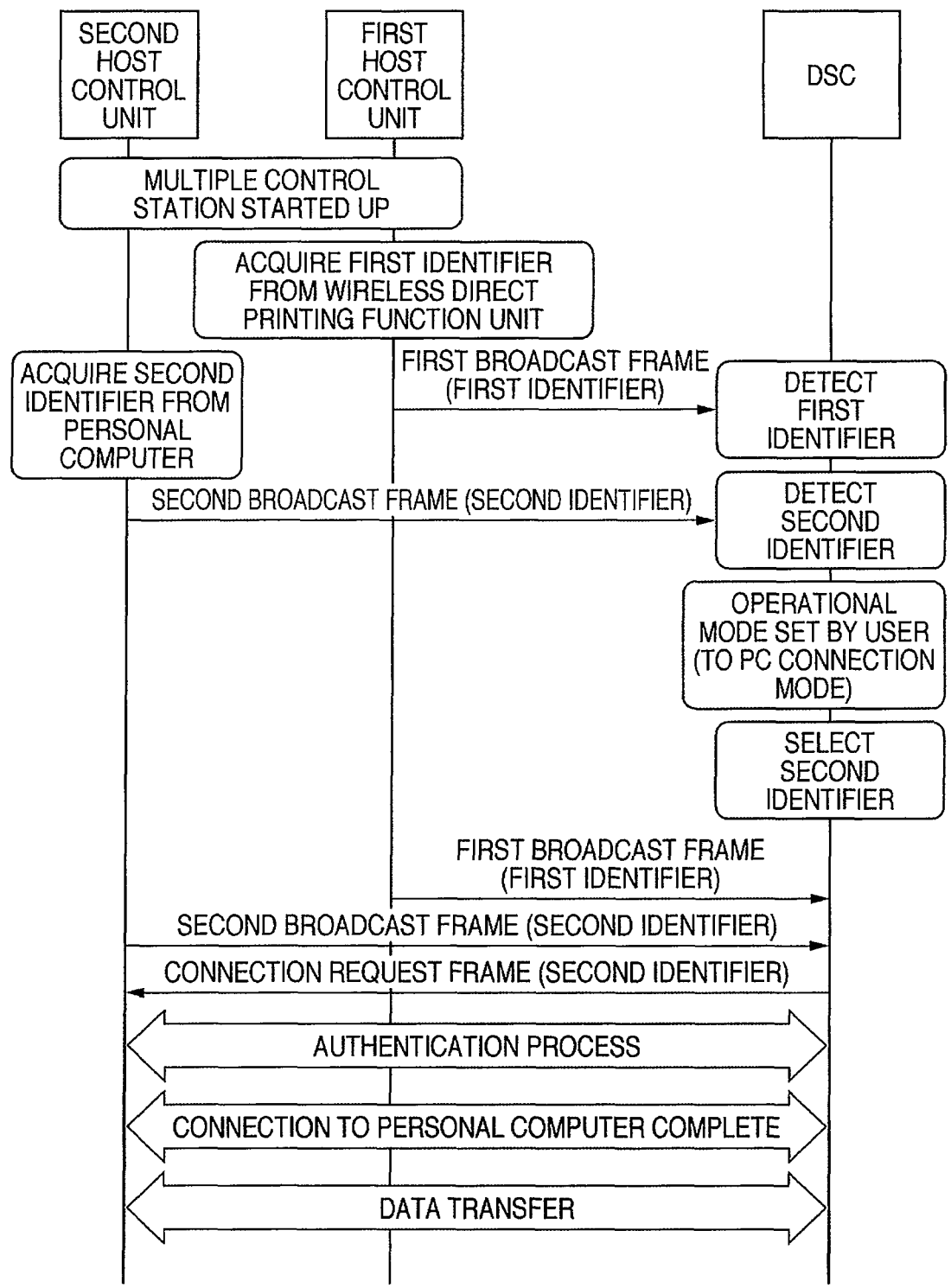
FIG. 4 is a diagram illustrating an operational sequence carried out when a multiple control station 201 has received a request to connect with a personal computer 21 from a digital still camera 52.

FIG. 4 is a diagram illustrating an operational sequence carried out when the multiple control station 201 has received a request to connect with the personal computer 21 from the digital still camera 52. However, for the sake of simplicity, only the logical exchange of frames between the first host control unit 202/the second host control unit 203 and the digital still camera 52 is illustrated in FIG. 4, in the same manner as FIG. 3.

First, when the multiple control station 201 is started up, the first host control unit 202 receives the first host identifier from the wireless-direct-printing function unit 103, and repeatedly transmits a first broadcast frame, which includes the first host identifier, in a cyclical manner. Furthermore, the second host control unit 203 repeatedly transmits a second broadcast frame, which includes the second host identifier configured through the abovementioned pairing process, in a cyclical manner. Note that at this point in time, the print-function selection unit 105 selects the USB interface unit 106 and logically connects it to the print function unit 107. In other words, the multiple control station 201 can function as a peripheral device connected to the personal computer 21 via the USB cable 23 and execute printing operations.

Meanwhile, the digital still camera 52 alternately receives the first broadcast frame and the second broadcast frame, and detects the first and second host identifiers included in the respective broadcast frames. Here, if the user wishes to connect the digital still camera 52 to the personal computer 21, s/he specifies a PC connection mode by performing button operations or the like on the digital still camera 52.

Through this, the digital still camera 52 selects the second host identifier, which specifies the personal computer 21 as the host based on the configuration made through the above-mentioned pairing process. A connection request frame that includes the second host identifier is then transmitted as a response to the second broadcast frame.

Meanwhile, when the multiple control station 201 receives the connection request frame that includes the second host identifier, the host arbitration unit 204 within the multiple control station 201 takes that connection request frame from the UWB wireless unit 104. The host arbitration unit 204 then analyzes the details of this frame, and passes the connection request frame to the second host control unit 203 if the results of the analysis indicate that the second host identifier is present therein.

Thereafter, the personal computer 21 performs an authentication process with the digital still camera 52 based on the WUSB host protocol via the multiple control station 201, which takes on the role of WUSB adapter. Once the authentication process is successful and the connection between the digital still camera 52 and the personal computer 21 is ultimately completed, the digital still camera 52 functions as a peripheral device of the personal computer 21, and transfers photographic data and the like thereto/therefrom.

Next, a process by which the function units of the multiple control station 201 are switched in accordance with the host identifier present in the connection request frame received from the digital still camera 52 shall be described with reference to FIG. 7.

FIG. 7 is a flowchart illustrating a control procedure of the multiple control station 201 according to the first embodiment of the present invention. First, in step S701, the first host control unit 202 receives the first host identifier from the wireless-direct-printing function unit 103, and transmits the first broadcast frame, which includes the first host identifier. This transmission is carried out by the UWB wireless unit 104 via the host arbitration unit 204. Next, in step S702, the second host control unit 203 transmits the second broadcast frame, which includes the second host identifier configured through the pairing process executed with the personal computer 21. This transmission is also carried out by the UWB wireless unit 104 via the host arbitration unit 204.

After this, in step S703, it is determined whether or not a connection request frame has been received from the digital still camera 52. If the connection request frame has not been received, the procedure returns to S701, and the abovementioned broadcast frame transmission is repeated. However, if the connection request frame has been received from the digital still camera 52, the procedure advances to step S704, where the host arbitration unit 204 determines whether the identifier present in the connection request frame is the first host identifier or the second host identifier. If the results of the determination indicate that the identifier is the first host identifier, the procedure advances to step S705, where the host arbitration unit 204 passes the connection request frame to the first host control unit 202. Then, in step S706, the first host control unit 202 performs an authentication process with the digital still camera 52 as mentioned above, after which the wireless-direct-printing process is executed by the wireless-direct-printing function unit 103.

On the other hand, if the results of the determination in step S704 indicate that the identifier present in the connection request frame is the second host identifier, the procedure advances to step S707, where the host arbitration unit 204 passes the connection request frame to the second host control unit 203. Then, in step S708, the second host control unit 203 controls the adapter function unit 102 with the personal computer 21, and the multiple control station 201 functions as the WUSB adapter of the digital still camera 52.

The operations described above make it possible for the multiple control station 201 to select and execute operations for the direct printing mode or the PC connection mode as appropriate, without requiring the user to carry out any particular operations on the multiple control station 201.

Second Embodiment

Next, a second embodiment according to the present invention shall be described in detail with reference to the drawings.

Note that the internal configuration of a multiple control station 201 according to the second embodiment is identical to that illustrated in FIG. 1 and described in the first embodiment, and thus descriptions thereof shall be omitted herein.

Figure 5:
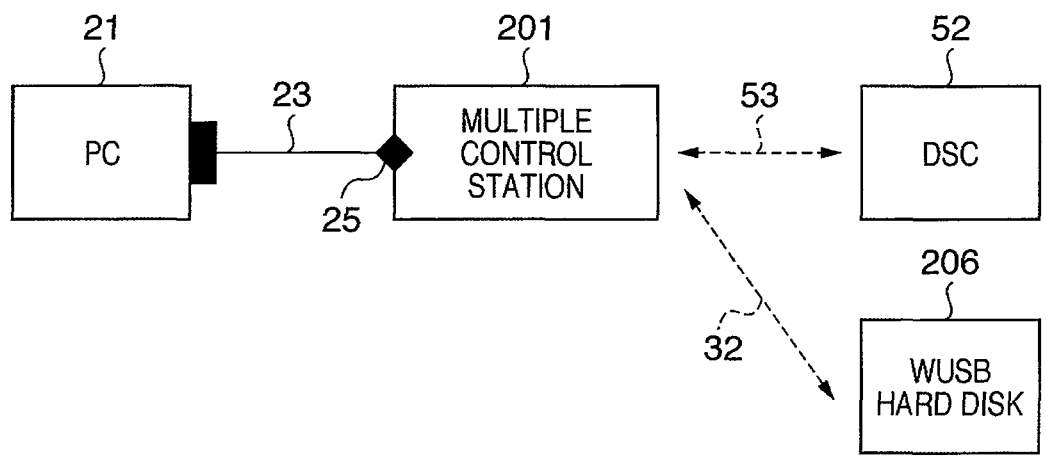
FIG. 5 is a diagram illustrating an example of the system configuration according to a second embodiment of the present invention.

FIG. 5 is a diagram illustrating an example of the system configuration according to the second embodiment of the present invention. As illustrated in FIG. 5, the system of the second embodiment is configured of a multiple control station 201, a personal computer 21, a digital still camera 52, and a WUSB hard disk (called simply a "hard disk" hereinafter) 206. The hard disk 206 is connected to the personal computer 21 as a peripheral device thereof. Accordingly, the hard disk 206 transfers data to/from the personal computer 21 via the multiple control station 201, which functions as an adapter. Furthermore, it is assumed that when the operational sequence of the system is commenced, the digital still camera 52 is not running, meaning that only the hard disk 206 is connected to the multiple control station 201.

Figure 6:
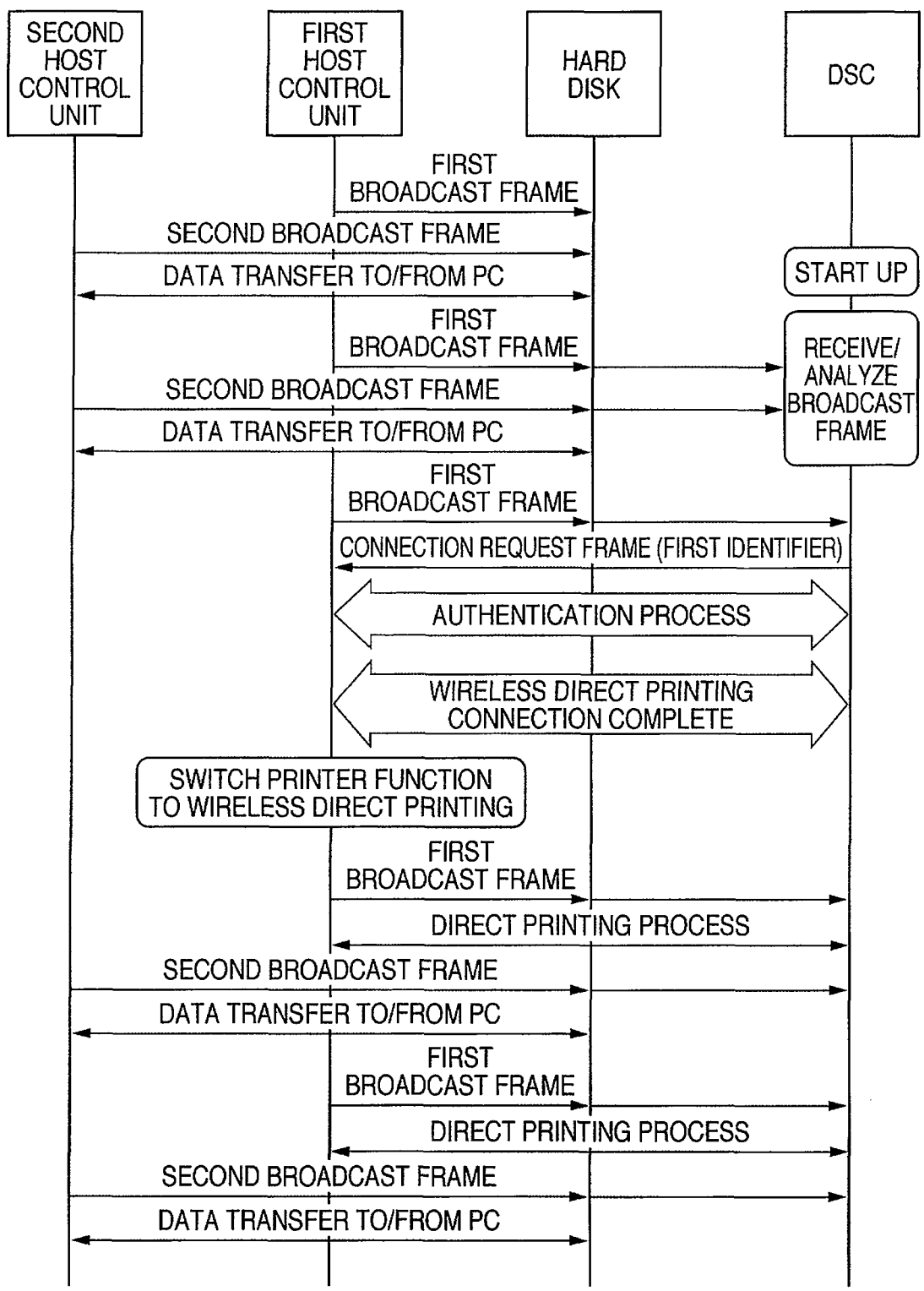
FIG. 6 is a diagram illustrating an operational sequence according to the second embodiment of the present invention.

FIG. 6 is a diagram illustrating the operational sequence according to the second embodiment of the present invention. A first host control unit 202 repeatedly transmits a first broadcast frame in a cyclical manner. A first host identifier, for identifying the multiple control station 201 as the wireless-direct-printing host, is present in the first broadcast frame. However, when this operational sequence is commenced, the digital still camera 52 is not yet connected to the multiple control station 201, and thus a wireless frame serving as a response to the first broadcast frame does not exist.

Similarly, a second host control unit 203 repeatedly transmits a second broadcast frame in a cyclical manner. A second host identifier, for identifying the personal computer 21 as the host, is present in the second broadcast frame. Because the hard disk 206 is currently connected to the personal computer 21, data is transferred between the personal computer 21 and the hard disk 206 in accordance with the WUSB protocol in a time slot specified within the second broadcast frame. Here, it is assumed that an authentication process between the hard disk 206 and the personal computer 21 has already been completed prior to the commencement of the sequence illustrated in FIG. 6. Furthermore, there are both cases where the data is transferred from the personal computer 21 to the hard disk 206, and cases where the data is transferred from the hard disk 206 to the personal computer 21.

In such a state, if the digital still camera 52 is then started up in the wireless-direct-printing mode, the digital still camera 52 receives the first broadcast frame and the second broadcast frame that are being repeatedly transmitted by the multiple control station 201. The digital still camera 52 then detects the first host identifier and the second host identifier present in the respective broadcast frames.

Because the digital still camera 52 is being started up in the wireless-direct-printing mode, the digital still camera 52 selects the first host identifier, specifying the wireless-direct-printing host, and responds to the first broadcast frame with a connection request frame. The first host identifier is present in the connection request frame, and therefore when the multiple control station 201 receives this connection request frame, the host arbitration unit 204 within the multiple control station 201 takes that connection request frame from the UWB wireless unit 104. The host arbitration unit 204 then analyzes the details of this frame, thus detecting that the first host identifier is present therein, and passes the connection request frame to the first host control unit 202.

Thereafter, the first host control unit 202 performs an authentication process with the digital still camera 52 based on the WUSB host protocol, and ultimately, the connection between the digital still camera 52 and the multiple control station 201 is completed. The digital still camera 52 is then able to execute wireless direct printing.

Next, the first host control unit 202 notifies a connection detection unit 205 that the digital still camera 52 has been connected for wireless-direct-printing operations. The connection detection unit 205 then instructs the print-function selection unit 105 to disconnect the USB interface unit 106, which has thus far been logically connected to the print function unit 107. The connection detection unit 205 further instructs the print-function selection unit 105 to connect the wireless-direct-printing function unit 103 to the print function unit 107. Through this, the print function unit 107 is connected to the digital still camera 52 based on the control of the wireless-direct-printing function unit 103, enabling photographs to be printed from the digital still camera 52.

A characteristic of the second embodiment is that the wireless connection between the second host control unit 203 and the hard disk 206 can be maintained even if the first host control unit 202 is connected to the digital still camera 52 to implement the wireless-direct-printing function. In other words, the first host control unit 202 and the second host control unit 203 can operate as two independent hosts because they share the UWB wireless unit 104 over a time-division scheme through the host arbitration unit 204.

As illustrated in FIG. 6, the digital still camera 52 continuously communicates with the first host control unit 202 within the multiple control station 201 over the time slot specified in the first broadcast frame. At this time, wireless frames of photographic data, control information, and the like are exchanged between the digital still camera 52 and the wireless-direct-printing function unit 103 through the processing performed by the host arbitration unit 204.

On the other hand, the hard disk 206 continuously communicates with the second host control unit 203 within the multiple control station 201 over the time slot specified in the second broadcast frame. At this time, wireless frames of data read out from the hard disk 206, data written to the hard disk 206, control information, and the like are exchanged between the hard disk 206 and the adapter function unit 102 through the processing performed by the host arbitration unit 204.

As described thus far, according to the second embodiment, the multiple control station 201 can continue to operate as an adapter even if the multiple control station 201 connected to the digital still camera 52 is currently printing photographs.

Note that the present invention may be applied to a system comprising a plurality of devices (for example, a host computer, an interface device, a reader, a printer, and so on), or may be applied to an apparatus comprising a single device (for example, a copy machine, a facsimile device, and so on).

Furthermore, it goes without saying that the object of the present invention can also be achieved by supplying, to a system or apparatus, a storage medium in which the program code for software that realizes the functions of the aforementioned embodiment has been stored, and causing a computer (CPU or MPU) of the system or apparatus to read out and execute the program code stored in the storage medium.

In such a case, the program code itself read out from the computer-readable storage medium implements the functionality of the aforementioned embodiment, and the storage medium in which the program code is stored composes the present invention.

Examples of a storage medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

Furthermore, the program code read out from the storage medium may be written into a memory provided in a function expansion board installed in the computer or a function expansion unit connected to the computer. Then, a CPU or the like included in the function expansion board or expansion unit performs all or part of the actual processing based on instructions included in the program code, and the functions of the aforementioned embodiment may be implemented through that processing. It goes without saying that this also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-157745, filed Jun. 14, 2007, which is hereby incorporated by reference herein in its entirety.

What is claimed is:

1. A communication system comprising a control station and a terminal station, wherein the control station comprises:
   a first control unit that controls execution of a host function;
   a second control unit that controls execution of an adapter function;
   a transmission unit that transmits a first broadcast frame and a second broadcast frame wherein the first broadcast frame includes a first identifier for the execution of the host function and the second broadcast frame includes a second identifier, which is acquired from another control station, for the execution of the adapter function;
   a reception unit that receives a connection request for requesting connection with the first identifier or the second identifier from the terminal station; and
   a connection unit that connects whether to connect the terminal station to the first control unit in a case where the first identifier is included in the connection request received by the reception unit and connects the terminal station to the second control unit in a case where the second identifier is included in the connection request received by the reception unit.

2. A communication system according to claim 1, wherein the transmission unit is adapted to transmit over the wireless channel using time division multiplexing.

3. A communication apparatus comprising:
   a first control unit that has controls execution of a host function;
   a second control unit that controls execution of an adapter function;
   a transmission unit that transmits a first broadcast frame and a second broadcast frame over the wireless channel using time division multiplexing, wherein the first broadcast frame includes a first identifier for the execution of the host function and the second broadcast frame includes a second identifier, which is acquired from another communication apparatus, for the execution of the adapter function;
   a reception unit that receives a connection request for requesting connection with the first identifier or the second identifier from the terminal device; and a connection unit that connects the terminal device to the first control unit in a case where the first identifier is included in the connection request received by the reception unit and connects the terminal device to the second control unit in a case where the second identifier is included in the connection request received by the reception unit.

4. The apparatus according to claim 3, wherein the host function is a wireless-direct-printing function operable to perform wireless direct printing from the terminal device.

5. A control method for a communication apparatus, the method comprising:
   transmitting a first broadcast frame and a second broadcast frame wherein the first broadcast frame includes a first identifier for execution of a host function by a first control unit and the second broadcast frame includes a second identifier, which is acquired from another communication apparatus, for execution of an adapter function by a second control unit;
   receiving a connection request frame that requests connection with the first identifier or the second identifier from the terminal station; and
   connecting the terminal station to the first control unit in a case where the first identifier is included in the connection request received in the receiving step and connects the terminal station to the second control unit in a case where the second identifier is included in the connection request frame received in the receiving step.

6. A control method according to claim 5, wherein the transmission is performed over the wireless channel using time division multiplexing.

7. A non-transitory computable-readable recording medium on which is stored a program for performing a control method, the method comprising:
- transmitting a first broadcast frame and a second broadcast frame wherein the first broadcast frame includes a first identifier for execution of a host function by a first control unit and the second broadcast frame includes a second identifier, which is acquired from another communication apparatus, for execution of an adapter function by a second control unit;
- receiving a connection request frame that requests connection with the first identifier or the second identifier from the terminal station; and
- connecting the terminal station to the first control unit in a case where the first identifier is included in the connection request received in the receiving step and connects the terminal station to the second control unit in a case where the second identifier is included in the connection request frame received in the receiving step.

8. The apparatus according to claim 3, wherein the adapter function is operable to connect said another communication apparatus to the second control unit via a wired interface.

\* \* \* \* \*